United States Patent
Davidson et al.

(10) Patent No.: US 6,757,687 B2
(45) Date of Patent: Jun. 29, 2004

(54) STORAGE OF DATA ENTRIES IN DIGITAL DEVICES AND METHODS

(75) Inventors: Brian Davidson, Woking (GB); Steven Mote, Musgrove (GB); Robert Newstead, Frimley (GB); Ronald J Lander, Jr., Calabasas, CA (US); David Fisher, London (GB)

(73) Assignee: Nokia Corporation, Espoo (FI)

( * ) Notice: Subject to any disclaimer, the term of this patent is extended or adjusted under 35 U.S.C. 154(b) by 171 days.

(21) Appl. No.: 09/867,455

(22) Filed: May 31, 2001

(65) Prior Publication Data

US 2002/0191965 A1 Dec. 19, 2002

(51) Int. Cl.$^7$ .............................................. G06F 17/30
(52) U.S. Cl. ............................. 707/101; 705/8; 705/37
(58) Field of Search .............................. 707/1, 3, 6, 7, 707/9, 101, 102, 104.1, 200; 705/8, 37

(56) References Cited

U.S. PATENT DOCUMENTS 5,661,523 A * 8/1997 Yamane .................... 348/390.1
5,978,771 A * 11/1999 Vandivier, III ................ 705/8
6,108,383 A * 8/2000 Miller et al. ................ 375/240
6,157,929 A * 12/2000 Zamiska et al. ............ 707/200
6,211,905 B1 * 4/2001 Rudt et al. ..................... 348/88
2002/0143693 A1 * 10/2002 Soestbergen et al. ......... 705/37

FOREIGN PATENT DOCUMENTS

| JP | 91 128276 A | 5/1997 |
|---|---|---|
| JP | 11 27251 A | 10/1999 |
| JP | 11 353224 A | 12/1999 |
| JP | 2000 89983 A | 3/2000 |
| JP | 03216606 A | 11/2001 |

* cited by examiner

Primary Examiner—Charles Rones
(74) Attorney, Agent, or Firm—Antonelli, Terry, Stout & Kraus, LLP

(57) ABSTRACT

The present invention provides a storage means to store digital data entries, chronometer means arranged to provide chronological information to the device, and data entry arrangement means to manipulate data entries, wherein the data entry arrangement means is configured to utilize the chronometer means to provide a chronological data entry coding to data entries based on the chronological sequence in which the data entry is stored on and accessed from the data storage means, and wherein the data entry arrangement means is further configured to analyze the data entry chronological data coding and based on the coding, compress the data entry during a data entry compression cycle.

27 Claims, 2 Drawing Sheets

STORAGE OF DATA ENTRIES IN DIGITAL DEVICES AND METHODS

BACKGROUND OF THE INVENTION

1. Field of the Invention

The invention relates to a digital device configured to store, and provide access to, data entries based on considering data entry chronology (age) and usage. It also relates more generally, to a method of storing, and providing access to, digital data entries based on considering data entry chronology and usage.

2. Description of the Prior Art

Information is becoming increasingly available and being provided for use with digital devices. For example, computers connected to the internet have access to a large volume of information, much of which can be stored on the computer. In the case of the emerging mobile society, increasing travel has resulted in an increased number of information sources available to individuals, for example, information derived from day to day business and/or social activities. Each of these sources generate information which can conveniently be stored on portable digital devices such as laptop/palmtop computers and mobile phones.

It is increasingly possible to have affordable large capacity digital storage devices. In addition, it is also possible to have relatively small sized digital devices which have comparatively large memory capacities compared to equivalent sized devices of a few years ago. Nevertheless, the storage medium used by digital devices have a finite storage capacity, which can be increasingly filled with the wealth of information which is becoming available. Solutions are required to allow more information to be stored on smaller devices and thus address the issue of the finite capacity of storage media.

Solutions exist which effectively provide more available space for a given finite capacity storage device by compressing the data on the storage device. Thus, the data occupies comparatively less space on the storage media, leaving more available space for further data. However, compressed data needs to be de-compressed before it can be accessed, thus resulting in relatively slow data access.

SUMMARY OF THE INVENTION

Accordingly, in a first aspect, the present invention provides a digital device comprising data storage means to store digital data entries, chronometer means arranged to provide chronological information to the device, and data entry arrangement means to manipulate data entries, wherein the data entry arrangement means is configured to utilize the chronometer means to provide a chronological data entry coding to data entries based on the chronological sequence in which the data entry is stored on and accessed from the data storage means, and wherein the data entry arrangement means is further configured to analyze the data entry chronological data coding and based on the coding, compress the data entry during a data entry compression cycle.

In the case where the data entry is written to the storage means for the first time, the chronological code corresponds to the date and time on which the entry was made. In the case of subsequent access of the data entry, the chronological code is changed to refer to the subsequent access. During a data entry compression cycle, the data entry arrangement means analyzes one or more data entry chronological codes and determines whether or not (or to what extent) the or each associated data entries should be compressed. So, for example, a data entry which was stored some time ago, and not accessed at all, would have an old chronological data coding and, as such, would be compressed. However, a data entry which has been accessed recently would remain un-compressed and be ready for relatively speedy retrieval.

One way of allowing user access to the data entries is, of course, to arrange the data entry arrangement means to provide the data entries stored on the memory means, based on chronology and usage to a user of the digital device. Accordingly, access of data entries is also be based on data entry chronology and/or usage.

The present invention therefore minimizes the effect of relatively slow data access of compressed data and, at the same time, makes efficient use of the capacity of the data storage means. This is done by configuring the digital device to compress data entries based on data entry chronology and usage that is the invention compresses data based on when the data was accessed and also when it was stored on the storage means.

The data entry compression cycle may occur after a set interval of time, for example, after one day. Of course, the set interval of time may be held fixed or varied over a period of time. An example of the latter case is an initial data entry compression cycle occurring after one day, and the following data entry compression cycle occurring after a further two days. Accordingly, the data arrangement means would be arranged to run a data entry compression cycle after a set interval of time.

However, an effective way of managing the memory capacity of the data storage would be to base the data compression cycle on when the total data, or recent data entries, on the storage means occupy a certain proportion of the capacity of the data storage means, for example 5% of the total capacity of the storage means. Accordingly, the data entry arrangement means is arranged to run the data entry compression cycle when data entries occupy a certain proportion of the capacity of the data storage means.

A single data entry or, alternatively, a number of data entries may be compressed by the data entry arrangement means during a data entry compression cycle. Accordingly, the invention is not limited to compression of data entries occurring in batches.

It is important to note that the invention does not exclude compression of all data entries by default, for example, by the data entry arrangement means being configured to compress all data entries by default. However, upon subsequent use of a data entry, the coding provided to the data entry is changed by the data entry arrangement means and thus, during the next data compression cycle, the data may be compressed to the same, or preferably a differing degree.

In one embodiment, the size of a data entry may be considered in determining whether to compress the data entry. In such a case, the data entry arrangement means may be configured to consider the size of the data entry. So, for example, a large data entry may always be compressed by default whereas a relatively small data entry may be left un-compressed.

The same compression rate may be used for all data entry compressions. However, in an alternative embodiment, the device may be configured to vary the data entry compression rate based on the degree of data entry usage. So, for example, a data entry which has not been used for a while, but when used, was used quite frequently, is not compressed as much as compared with a data entry which wasn't used that frequently when in usage. If the size of the data entry is also to be taken into consideration, a data entry which occupies a large memory space but which is often used may be compressed to a limited degree, or not at all, whereas a data entry which is hardly used at all, regardless of the size of the data, may be compressed to a relatively high degree. In all such cases, the data entry arrangement means may be configured to utilize a data entry chronological coding designed so as to represent a particular compression rate for a particular chronology/usage. In this way, the invention considers how often data entries have been used and does not just consider when the data entry was last accessed.

It may be that a data entry remains un-used, or is moderately used, between compression cycles. In such cases, the data entry arrangement means may be configured to compress such a data entry to a greater degree during a subsequent data entry compression cycle, which may or may not be the next data entry compression cycle. This process may occur during a number of subsequent data entry compression cycles such that the data entry is progressively compressed to a greater degree.

To further release memory capacity, the digital device may be configured such that a data entry which has not been accessed for a pre-determined period of time, for example 6 months, is removed from the storage means. This may be by means of deletion from the storage means or transfer to an archive on a separate storage means. This separate storage means may be provided on a separate device which may, or may not, have the same configuration of the device of the claimed invention. Accordingly, the invention does not require the user to replenish the capacity of the storage means by wilfully remembering to remove old, unused data entries.

In a further embodiment, the data entry may be removed from the storage means following progressively increasing compression. This may, for example, be once the data entry has been compressed to a maximum, or pre-determined, level due to a lack of usage.

Each data entry may consist of a number of data fields (or portions), and each data field may contain data of differing detail and complexity. For example, in the case of a individual's personal details, one field would be the individual's name, another the address, and another a map to provide visual guidance as to where the person lives. One of the data entry fields may also be a sound file. As these fields contain information of varying complexity, they would occupy a corresponding differing amount of memory space when stored on the data storage means. In a further embodiment of the present invention, the data entry arrangement means may be arranged to compress a portion of such a data entry. Preferably, this portion is the portion of the data entry which would occupy a relatively large amount of memory space on the storage means. The compressed portions of the data entry may also be removed from the data entry storage means, as described above, possibly for retrieval later. This is a way of essentially trimming down the data entry over a period of time.

The digital device would preferably be configured to leave a portion of the data entry which allows a user to easily identify the data entry un-compressed, for example a heading/title, as such a data entry field would not occupy a large amount of space. In cases where a data entry does not have a heading or other such field which easily identifies the data entry, the digital device would preferably be configured to allow the user to provide such information.

In a further embodiment, the digital device may be arranged to store data entries of a particular usage and chronology in different areas of the data entry storage means. For example, recent data entries may be stored in a separate area of the storage means compared to old data entries. Data entries of a particular compression rate/ratio may also be stored in separate regions of the storage means. It may be that storage is provided not just in a separate area/region of a storage means, but in separate storage means altogether. This may be achieved by configuring the data arrangement means to use the chronological data code to identify the data entries of differing chronology and usage and thereby determine where the particular data entry should be stored. For example, chronological data entry codes could be devised to indicate specific compression ratios. Accordingly, if the digital device is configured to know that a particular chronological data entry code corresponds to a particular compression ratio, and that all the data entries compressed to the same ratio are located in the same region, knowledge of the location of this region will reduce data entry access time as a search of the entire data storage means would not be required. Such arrangements would also cluster wear and tear to particular areas/regions of one or more storage means.

In another embodiment, the digital device may comprise positioning means which registers where the device is in a particular geographical locality, and the data arrangement means is configured to associate the positional information provided by the positioning means with the chronological data entry codes. The positioning means may provide geographical information at the global or local scale. For example, the positional information may provide information concerning floor level, building level, street level, town level, metropolitan level, country level etc. Such arrangements would be able to identify data entries based not only on chronology and usage, but also on locality. Thus, it is possible to retrieve a data entry based firstly on a particular locality/area and secondly based on chronology and usage, or vice versa. So, for example, a user is able to travel from a first country to a second country and be able to easily access information which the user accessed when they were last in the second country. Similarly, a user could travel at street level, and when arriving at a particular street, easily access information which last accessed when the user was on the same street for example provide a list of items last purchased from a grocery store.

In another embodiment still, the data arrangement means may be arranged to allow user selected data entries to be compressed during a data compression cycle. This allows a user to interact with the device and initiate data entry compression of specific data entries. This may be done, for example, when a user knows that a data entry will not be required for a while. The user may also be able to select a particular compression rate and/or particular portions of a data entry for compression.

In a second aspect, the present invention provides a method of storing digital data comprising providing a data entry chronological coding to a data entry based on the chronological sequence in which the data entry is stored and accessed, analyzing the data entry chronological coding and, based on the coding, compressing the data entry during a compression cycle.

Obviously, the provision of data entries which have been stored by the method are included as an embodiment of the method.

Various embodiments of a digital device have been discussed above which utilize variations to the aforementioned method of storing digital data. Such methods of storing digital data are also within the scope of the invention. For example, the degree of compression may be varied based on chronology and/or usage, data entries may be progressively compressed and ultimately removed. Portions of data entries may also be compressed and removed. Data entries may also be stored, and therefore provided, based on geographical location.

BRIEF DESCRIPTION OF THE DRAWINGS

The invention will now be described with reference to the following figure in which.

DETAILED DESCRIPTION OF THE INVENTION

Figure 1:
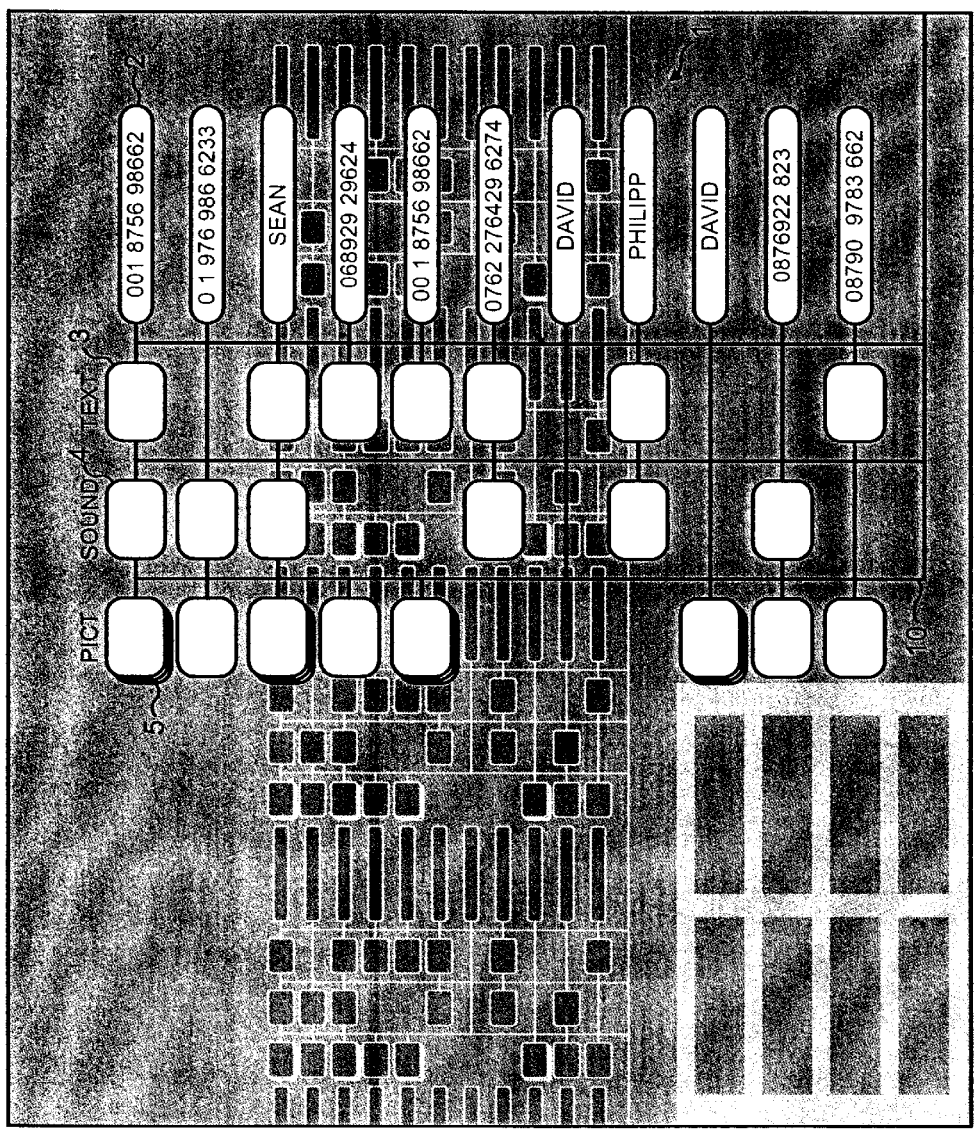
FIG. 1 is a schematic representation of data entries comprising a number of fields.

A communications device (not shown), in this case a phone, carries a number of data entries 1. Upon user request, the phone is arranged to display one or more data entries 1. FIG. 1 represents data entries 1, each having a primary heading field 2, and a number of sub-fields 3, 4, 5 associated with the primary heading field 2. In the case shown in FIG. 1, the primary heading field 2 is a telephone number or an individual's name, and the associated sub-fields are text fields 3, sound fields 4 and picture fields 5. More than one sub-field in the same category (text, sound, picture) can be associated with a corresponding primary heading field 2, as shown in FIG. 1 for the picture field 5. The sub-fields 3, 4, 5 may also be associated with one another so that, for example, all the sound files are categorized together. The association, in the present example, is also by geographical locality. The association of data fields is generally represented in FIG. 1 by lines 10.

Figure 2:
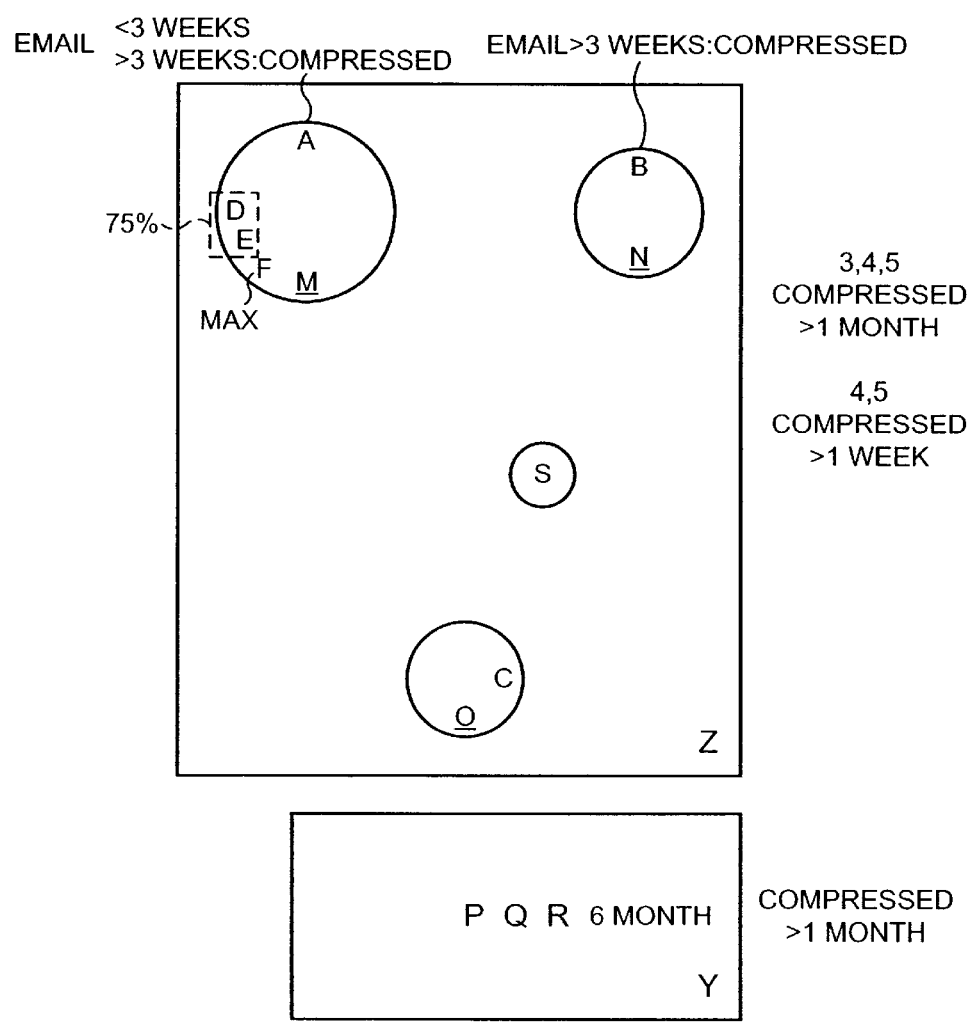
FIG. 2 is a schematic representation illustrating the scenario of a business person using a phone according to the present invention.

The operation of the phone is best represented by considering the example of a business person who periodically visits a number of clients located in a number of different cities and countries. Consider the situation where the business person arrives in a country Z after a period of 6 months to visit a number of clients A, B, C located in different cities M, N, O respectively. Clients D, E, F in city M are not being visited on this occasion. Clients P, Q, R in country Y were visited over 6 months ago and the corresponding data entries have not been accessed since. This scenario is represented in FIG. 2.

Upon arrival in country Z, the phone prioritizes data entries 1 based on chronology, usage and locality. This is done by a data entry compression cycle being automatically initiated upon arrival in the country. However, it should be borne in mind that the data compression cycle may be conducted upon leaving a particular region/country or, more generally, upon change in region/country. Therefore, all data entries 1 concerning clients, P, Q, R in country Y are compressed and phone memory space is cleared resulting in increased memory space available for the current business trip. The phone is also configured to compress portions of a data entry. In this case, the phone has been configured so that all data fields 3, 4, 5 for any data entries 1 which have not been accessed for 6 months are compressed. Sound and picture fields 4, 5 are also compressed as a matter of course, unless they have been accessed in the last week.

In addition, the phone is configured so that only those data entries which have not been accessed or stored on the phone in the last month are compressed. Therefore, data entries concerning clients D, E, which haven't been accessed in the last month, are also compressed. In fact, data entries for clients D, E were compressed to 50% during a previous data entry compression cycle, so they are further compressed to 25% during the current data entry compression cycle. Client F is actually no longer a client of the business person, and thus the corresponding data entry has not been accessed for a year. Accordingly, this data entry has been through a number of data entry compression cycles and is now compressed to a maximum rate. The user is notified of this by the phone and is given three options; remove client F data entry to an archive on the phone, transfer the data entry to the business person's personal computer back at the office, or delete the data entry altogether. The business person makes the last selection and the data entry for client F is deleted. However, if the business person had chosen one of the options which do not permanently delete the data entry, then the phone is configured to be able to recall the data entry back from the archive on the phone or from the business person's personal computer. Recall of the date entry may also be from any suitable telephone network device.

To access the data entries for clients A, B, C, the business person is initially provided only with the heading field 2 for each of the data entries 1. The text data field 3 for client A contains recent e-mail correspondence, some of which was accessed in the last week, others which have not been accessed for three weeks. The text data field 3 for client B contains e-mails which have not been accessed for 3 weeks. As a data entry compression cycle was completed upon arrival, the text data fields 3 for clients A, B which were accessed over a week ago have been compressed. However, the e-mail correspondence of last week with client A has not been compressed and is available for relatively quick access.

The data entry 1 for client A also contains sound and picture fields 4, 5. The sound field 4 contains dictated notes and the picture field 5 contains two presentations to be given to client A. The first of these presentations is relatively short and thus occupies a relatively small amount of space in the phone's memory. However, the second of these presentations is very large. Both of these picture fields 5, and the sound field 4, have been accessed in the last week. Accordingly, the data fields 4, 5 remain un-compressed and available for quick access. However, the phone may be configured such that, as one of the presentations is very large, it is compressed by 50% during the data entry compression cycle. The same may be true for the sound field 4.

The business person completes the visit with client A in city M and then visits client B in city N. The person knows that he or she will not require the data entry 1 for client A for a while, and thus initiates a data compression cycle for this data entry. Alternatively, the phone may be configured to automatically compress the data entry for client A upon arrival at city N. In the case where the large presentation in picture data entry field 5 has already been compressed by 50%, the picture data entry field 5 is now compressed to 25%.

During his visit with client B, the client provides directions to and information on a scenic park S which is conveniently located between cities N and O. This is sent to the phone of the business person as a text and picture data fields 3, 5. Upon receipt by the phone, the business person is requested by the phone to provide a heading data field 2 for the text and picture data field 3 and 5. Following completion of the visit with client B, the business person travels to city O to visit client C, but makes a stop over to visit scenic park S using the directions that were received from client B.

In summary, the phone is configured to consider a number of factors in determining whether, and to what extent, a data entry should be compressed. These primarily include data entry chronology and usage. One embodiment also considers geographical locality. Embodiments of the invention are also advantageously configured to progressively compress and remove data entries following lack of use.

What is claimed is:

1. A digital device comprising:

data storage means for storing digital data entries;

chronometer means for providing chronological information to the device;

positioning means which codes where the device is located in a particular geographical locality; and data entry arrangement means for manipulating the digital data entries and associating the positional information provided by the positioning means with the chronological information; and wherein the data entry arrangement means utilizes the chronometer means to provide a chronological data entry coding to the data entries based on a chronological sequence in which the data entries are stored and accessed from the data storage means, analyzes coding of the chronological information and the positional information and based on the analysis of the coding, of the chronological information and the positional information compresses the data entries during a data entry compression cycle.

2. A digital device in accordance with claim 1 wherein:

the digital device is mobile.

3. The digital device according to claim 1, wherein the data entry arrangement means is arranged to provide the data entries stored on the memory means, based on chronology and usage, to a user of the digital device.

4. The digital device according to claim 1, wherein the data arrangement means runs the data entry compression cycle after a set interval of time.

5. The digital device according to claim 1, wherein the data entry arrangement means runs the data entry compression cycle when data entries occupy a certain proportion of a capacity of the data storage means.

6. The digital device according to claim 1, wherein the data entry arrangement means compresses at least one data entry during the data entry compression cycle.

7. The digital device according to claim 1, wherein the data entry arrangement means compresses all data entries by default during the data entry compression cycle.

8. The digital device according to claim 1, wherein the data entry arrangement means considers a size of the data entry.

9. The digital device according to claim 1, wherein the device varies a data entry compression rate of the data entry compression cycle based on a degree of data entry usage.

10. The digital device according to claim 9, wherein the data entry arrangement means utilizes the chronological data entry coding representing a compression rate for a particular chronology and usage.

11. The digital device according to claim 1, wherein the data entry arrangement means compresses one of an un-used or used data entry to a greater degree during a subsequent data entry compression cycle.

12. The digital device according to claim 11, wherein the digital device removes a data entry from the storage means following progressively increasing compression of the data entry.

13. The digital device according to claim 1, wherein the digital device, when a data entry has not been accessed for a pre-determined period of time removes the data entry from the storage means.

14. The digital device according to claim 13, wherein the removal of the data entry is by means of deletion from the storage means or a transfer to an archive of a separate storage means.

15. The digital device according to claim 1, wherein each data entry comprises portions and the data entry arrangement means compresses a portion of a data entry.

16. The digital device according to claim 15, wherein the portion of the data entry is a portion of the data entry which occupies a determined amount of memory space of the storage means.

17. The digital device according to claim 15, wherein the device allows a user to select a particular portion of a data entry for compression.

18. The digital device according to claim 1, wherein the digital device allows the user to provide a data field to the data entry allowing identification of the data entry.

19. The digital device according to claim 1, wherein the digital device stores data entries of a particular usage and chronology in different areas of the data entry storage means.

20. The digital device according to claim 19, wherein the data arrangement means uses a chronological data code to identify data entries of differing chronology and usage to determine where the data entry should be stored.

21. The digital device according to claim 1, wherein the data arrangement means allows user selected data entries to be compressed during the data entry compression cycle.

22. The digital device according to claim 1, wherein the device allows a user to select a particular compression rate.

23. A method for storing digital data comprising:

storing data entries in a device and accessing the stored data entries in the device; and wherein the stored data entries are based on a chronological sequence and a position of where the device is located with the data entries being stored containing chronological information and positional information regarding the device, the coding of the chronological information and positional information is analyzed and based on the analysis of the coding, of the chronological information and the positional information the data entries are compressed during a data entry compression cycle.

24. A method in accordance with claim 23 wherein:

the device is a mobile device.

25. The method according to claim 23, wherein a degree of compression is varied based on the chronological coding and usage of the data entries.

26. The method according to claim 23, wherein the data entries are progressively compressed and thereafter removed.

27. The method according to claim 23, wherein portions of data entries are compressed and removed.

* * * * *